(12) United States Patent
Ichishi et al.

(10) Patent No.: US 7,346,440 B2
(45) Date of Patent: Mar. 18, 2008

(54) VEHICLE AIR CONDITIONER HAVING LEARNING FUNCTION AND CORRECTING FUNCTION

(75) Inventors: Yoshinori Ichishi, Kariya (JP); Tatsumi Kumada, Gamagori (JP)

(73) Assignee: DENSO Corporation, Kariya (JP)

( * ) Notice: Subject to any disclaimer, the term of this patent is extended or adjusted under 35 U.S.C. 154(b) by 250 days.

(21) Appl. No.: 10/785,810

(22) Filed: Feb. 24, 2004

(65) Prior Publication Data

US 2004/0167691 A1    Aug. 26, 2004

(30) Foreign Application Priority Data

Feb. 25, 2003  (JP)  ............... 2003-047967

(51) Int. Cl.
| | |
|---|---|
| G06F 7/00 | (2006.01) |
| B61D 27/00 | (2006.01) |
| B60H 1/22 | (2006.01) |
| G05B 13/02 | (2006.01) |

(52) U.S. Cl. ............ 701/36; 454/75; 237/2 A; 700/47

(58) Field of Classification Search ........ 701/1, 701/29, 30, 35, 36, 33, 49; 454/75, 130; 237/2 A, 12.3 R; 236/49.3, 91 C, 94, 91 F; 62/186, 244; 700/28, 47; 165/41, 42, 186, 165/202

See application file for complete search history.

(56) References Cited

U.S. PATENT DOCUMENTS

| | | | | |
|---|---|---|---|---|
| 5,020,424 A | * | 6/1991 | Iida et al. ............ | 454/75 |
| 5,511,724 A | * | 4/1996 | Freiberger et al. ....... | 236/49.3 |
| 5,579,994 A | * | 12/1996 | Davis et al. ............ | 236/49.3 |
| 5,734,971 A | * | 3/1998 | Thayer et al. .......... | 455/181.1 |
| 6,186,883 B1 | * | 2/2001 | Baker .................. | 454/75 |
| 6,488,213 B2 | | 12/2002 | Ohga et al. ............ | 236/49.3 |
| 6,644,558 B2 | * | 11/2003 | Ohga et al. ............ | 236/49.3 |

(Continued)

FOREIGN PATENT DOCUMENTS

JP    3332992    7/2002

OTHER PUBLICATIONS

Office Action dated Sep. 18, 2007 in Japanese Application No. 2003-047967 with English translation thereof.

(Continued)

Primary Examiner—Jack Keith
Assistant Examiner—Edward Pipala
(74) Attorney, Agent, or Firm—Harness, Dickey & Pierce, PLC (57) ABSTRACT

A vehicle air conditioner includes an operating unit operated by a passenger for setting an air conditioning state in a passenger compartment, and a control unit for automatically controlling the air conditioning state in accordance with a detection value of an environment condition. The control unit performs a learning correction of a control characteristic in accordance with manual operations of the operating unit, and a number of the manual operations is indicated by using an indicator. Further, a number of the manual operations performed in an initial period and a number of the manual operations performed in an immediately recent period are comparably indicated on the indicator. Therefore, a passenger can realize the effect of the learning correction, even when the number of the manual operation is decreased after the learning correction is performed.

8 Claims, 9 Drawing Sheets

U.S. PATENT DOCUMENTS

| | | | |
|---|---|---|---|
| 6,827,284 B2* | 12/2004 | Ichishi et al. | 236/49.3 |
| 2003/0066297 A1 | 4/2003 | Ichishi et al. | |
| 2003/0127527 A1* | 7/2003 | Ichishi et al. | 236/49.3 |
| 2005/0077037 A1* | 4/2005 | Pham et al. | 165/202 |

OTHER PUBLICATIONS

"Vehicle Control Technique Regarding Driving Support System", Instrument and Control Academy (Instrument Automatic Control Association), No. 40, III, Mar. 10, 2001, pp. 214-219.

* cited by examiner

VEHICLE AIR CONDITIONER HAVING LEARNING FUNCTION AND CORRECTING FUNCTION

CROSS REFERENCE TO RELATED APPLICATION

This application is based on Japanese Patent Application No. 2003-47967 filed on Feb. 25, 2003, the disclosure of which is incorporated herein by reference.

BACKGROUND OF THE INVENTION

1. Field of the Invention

The present invention is related to a vehicle air conditioner for automatically performing air conditioning of a passenger compartment in accordance with a control program, and for learning a passenger's operation so as to correct control characteristics of the control program.

2. Description of Related Art

Conventionally, various sensors are used for detecting environmental conditions, and an automatic air-conditioning in a passenger compartment is performed based on predetermined control characteristics. According to JP Patent No. 3332992, when a passenger manually operates so that an air conditioning state is changed, the manual operation is learned and the control characteristic is corrected according to the manual operation, so as to adapt to a passenger's preference.

The manual operation is learned and the control characteristics are corrected, so that a frequency of the manual operation decreases. Thus, in the above vehicle air conditioner, when the automatic control is preferably performed after the learning and correcting process, the frequency of the manual operation is decreased. However, in this case, it is difficult for the passenger to realize the effect of the learning and correction function.

SUMMARY OF THE INVENTION

In view of the foregoing problems, it is an object of the present invention to provide a vehicle air conditioner and its control program in which a passenger can easily realize the effect of a learning and correction function.

According to the present invention, a vehicle air conditioner includes an environmental condition detection unit that detects a detection value relevant to an environmental condition of an air conditioning in a passenger compartment, an operating unit that is operated by a passenger for setting an air conditioning state in the passenger compartment, and a control unit. The control unit automatically controls the air conditioning state in accordance with the detection value of the environmental condition which is detected by the environmental condition detection unit, and performs a learning correction of a control characteristic of the automatic control in accordance with specific operations of the operating unit. Further, the vehicle air conditioner includes an information unit for informing an information relevant to a frequency of the specific operations in the learning correction, and the control unit controls an operation of the information unit in accordance with the frequency of the specific operations. Thus, a passenger in the passenger compartment can easily realize the effect of the learning and correction function.

Preferably, the control unit controls the operation of the information unit such that the information unit comparably informs a number of the specific operations of the operating unit, which is performed in a first predetermined period, and a number of the specific operations of the operating unit which is performed in a second predetermined period, which is later than the first predetermined period. For example, the first predetermined period is a time period immediately after a start operation of the learning correction of the control unit, and the second predetermined period is a time period immediately before the control unit controls the operation of the information unit. Therefore, the learning and correction function can be effectively informed to the passenger.

More preferably, the control unit controls the operation of the information unit such that the information unit informs a progress degree of the learning correction in accordance with the frequency of the specific operations. Further, the control unit controls the operation of the information unit such that, as the frequency of the specific operations decreases, the progress degree of the learning correction is improved.

For example, the information unit is an indicating unit which indicates the information relevant to the frequency of the specific operations of the operating unit.

According to the present invention, a program process of a computer for a vehicle air conditioner includes: a step for detecting a detection value of an environmental condition, which is relevant to an environmental condition for performing air conditioning in a passenger compartment, by an environmental condition detection unit; a step for performing an automatic control of the air conditioning state in the passenger compartment in accordance with a control characteristic based on the detection value of the environmental condition, and a learning correction of the control characteristic in accordance with a specific operation signal from an operating unit that is operated by a passenger for changing the air conditioning state of the passenger compartment; and a control step for controlling an information operation of an information unit that informs an information relevant to a frequency of specific operations of the operation unit, which are relevant to the learning correction of the control characteristic. Thus, passenger can easily realize the effect of the learning and correction function.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

The first embodiment of the present invention will be now described with reference to FIGS. 1-7.

Figure 1:
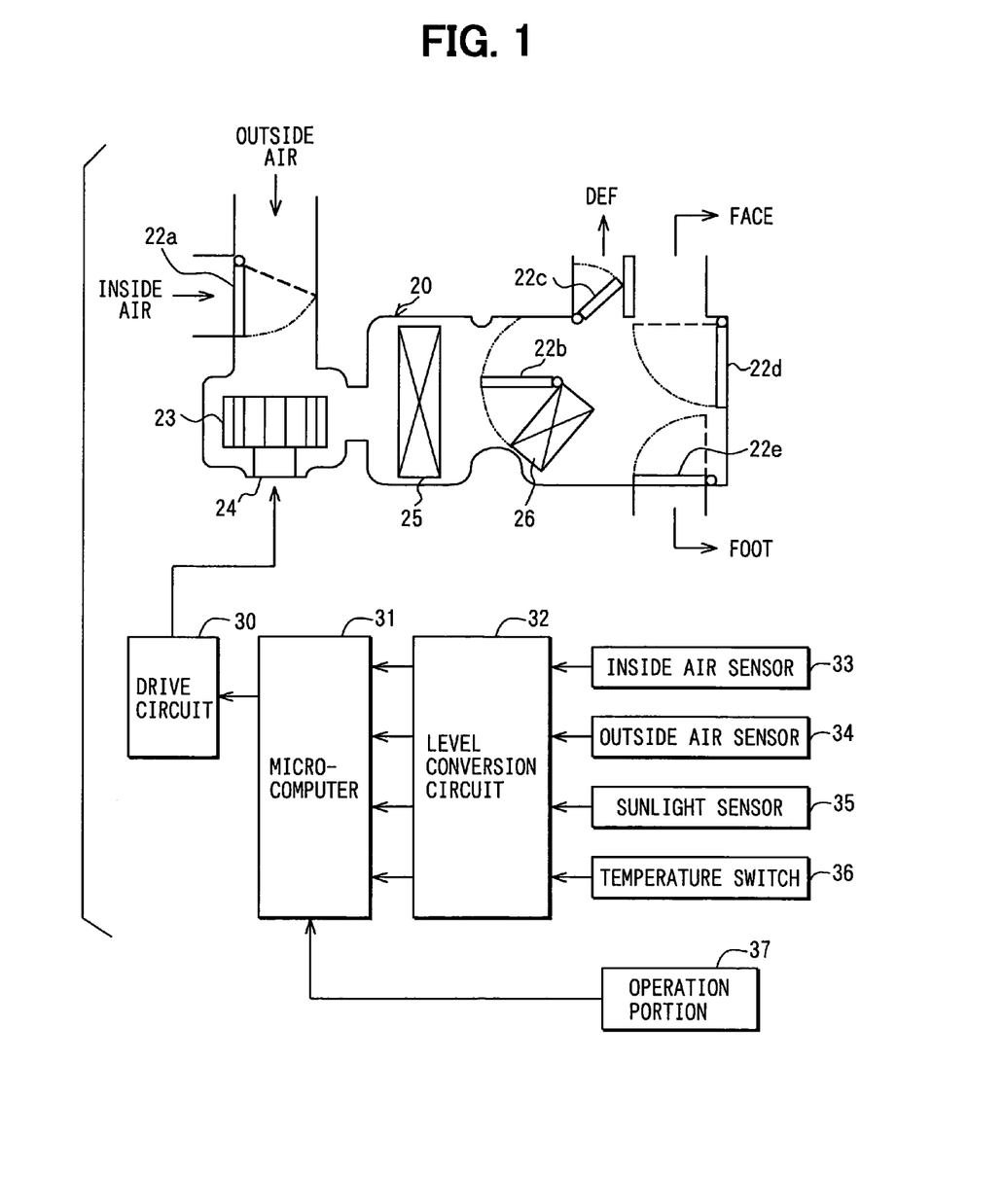
FIG. 1 is a schematic diagram showing a structure of a vehicle air conditioner according to a first embodiment of the present invention.

As shown in FIG. 1, an air conditioning unit 20 (A/C unit) of a vehicle air conditioner is provided on a front side with respect to a dashboard that is located at a front side in a passenger compartment of the vehicle. An inside/outside air switching door 22a is provided at a most upstream side of the air conditioning unit 20 with respect to an air flow direction, for setting an inside/outside air introduction mode.

The inside/outside air switching door 22a is provided in an area where an outside air introduction port and an inside air introduction port are divided. The inside/outside air switching door 22a is rotated by an actuator (not shown), so as to adjust an air flow amount ratio between inside air from the inside air introduction port and outside air from the outside air introduction port.

A fun 23 is fixed to a blower motor 24. The fun 23 draws the introduced air and blows it a downstream side of the air conditioning unit 20, so as to blow the introduced air into the passenger compartment of the vehicle. An evaporator 25 and a heater core 26 are provided downstream of the fan 23. The evaporator 25 is connected with a compressor or the like, so as to construct a refrigerant cycle. The evaporator 25 cools air passing therethrough by evaporating refrigerant. Engine-cooling water circulates in the heater core 26, so that air is heated while the air passes through the heater core 26. An air mixing door (A/M door) 22b is provided at an upstream side of the heater core 26. An open degree of the A/M door 22b is controlled by an actuator (not shown). A ratio between air passing through the heater core 26 and air bypassing the heater core 26 is controlled by the A/M door 22b, so that temperature of air to be blown into the passenger compartment is controlled. The temperature-controlled air (i.e., conditioned air) is blown to the passenger compartment through at least an air outlet opening located at a downstream side of the air conditioning unit 20. As the open degree of the A/M door 22b decreases, air temperature to be blown into the passenger compartment decreases, and blown air becomes cool. A defroster door 22c, a face door 22d, and a foot door 22e are provided at a most downstream area of the air conditioning unit 20 for setting an air outlet mode. The doors 22c, 22d and 22e are operated by actuators (not shown), so that an air outlet mode such as a face mode, a bi-level mode, a foot mode, a foot-defroster mode and a defroster mode can be set.

Air blowing amount in the air conditioning unit 20 and each open degree of the doors 22a, 22b, 22c, 22d and 22e are controlled by a microcomputer (control unit) 31 through a driving circuit 30 and actuators (not shown). The doors 22a, 22b, 22c, 22d, and 22e are operated by the actuators. The driving circuit 30 drives the blower motor 24 based on a signal output from the microcomputer 31. The microcomputer 31 includes a central processing unit (CPU, not shown), a ROM, a RAM, a stand-by RAM, an I/O port and an A/D converter. The microcomputer 31 is a generally known computer.

Figure 7:
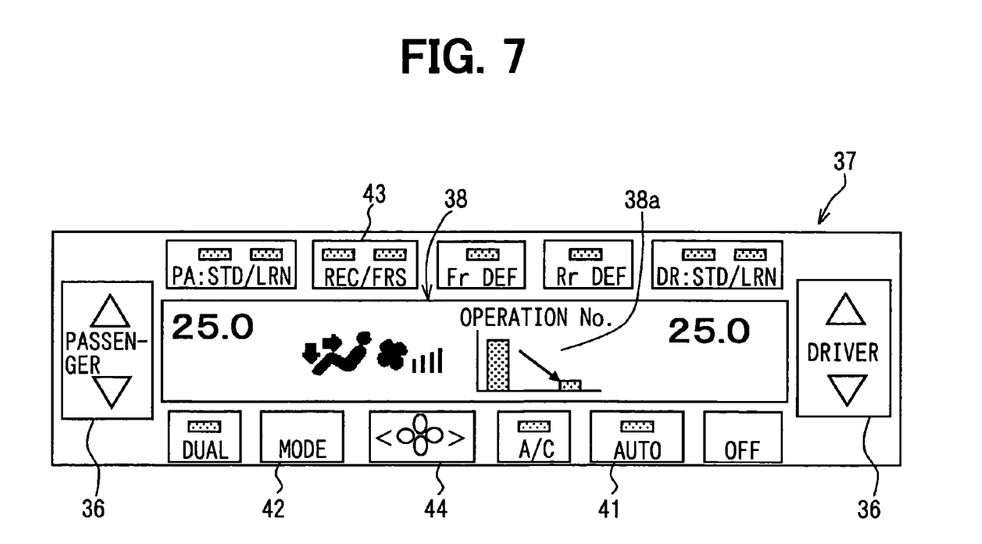
FIG. 7 is a schematic front view showing an operating portion indicating the operation number, according to the first embodiment.

The stand-by RAM stores (i.e., performs data backup) user preference data learned while the air conditioner is operated, even when an ignition switch (IG switch) is turned OFF. Electric power is directly supplied to the microcomputer 31 from a battery even when the IG switch is turned off. The stand-by RAM is also connected with a backup power supply (not shown), so that the microcomputer 31 is energized for a short time even if the battery is disconnected from the stand-by RAM. Signals are output from an air-conditioning operation panel (operating portion) 37, and the signals are input to the microcomputer 31. As shown in FIG. 7, the operating portion 37 includes an auto switch 41, a manual air outlet-mode selecting switch 42, a manual inside/outside air selecting switch 43, and a manual air-blowing amount setting switch 44, or the like. The auto switch 41 is used for setting an automatic control mode of the air conditioning operation. The manual air outlet-mode selecting switch 42 is for manually switching any one of the face mode (FACE mode), the bi-level mode (B/L mode), the foot mode (FOOT mode), the foot-defroster mode (F/D mode), and the defroster mode (DEF mode).

Referring back to FIG. 1, environmental conditions, which are effective to air conditioning in the passenger compartment, are detected by various sensors (environmental condition detection units), such as an inside air temperature sensor 33, an outside air temperature sensor 34, a sunlight sensor 35.

The detection values of the environmental condition detecting units are transmitted to a level conversion circuit 32. A/D conversion is respectively performed for each detection value in the level conversion circuit 32. The A/D converted detection value is input to the microcomputer 31 as an environmental condition. A passenger's preference temperature (set temperature) in the passenger compartment is input by a temperature setting switch 36. A signal from the temperature setting switch 36 is level-converted by the level conversion circuit 32, and the level-converted signal is input to the microcomputer 31.

The manual air-blowing amount setting switch 44 of the operating portion 37 has an air-amount up switch and an air-amount down switch. When the air-amount up switch is pushed one time, a signal is input to the input circuit of the microcomputer 31 from the air-amount up switch for increasing the blower voltage VF (voltage applied to the blower motor 24) by one level (e.g., 0.25V). Similarly, when the air-amount down switch is pushed one time, a signal is input to the input circuit of the microcomputer 31 from the air-amount down switch for reducing the blower voltage VF by one level (e.g., 0.25V).

The air outlet mode can be selected by manually operating the manual air outlet-mode selecting switch 42. The microcomputer 31 controls the blower motor 24, and the doors

22a, 22b, 22c, 22d and 22d based on the signals input from the above sensors and switches or the like.

Figure 2:
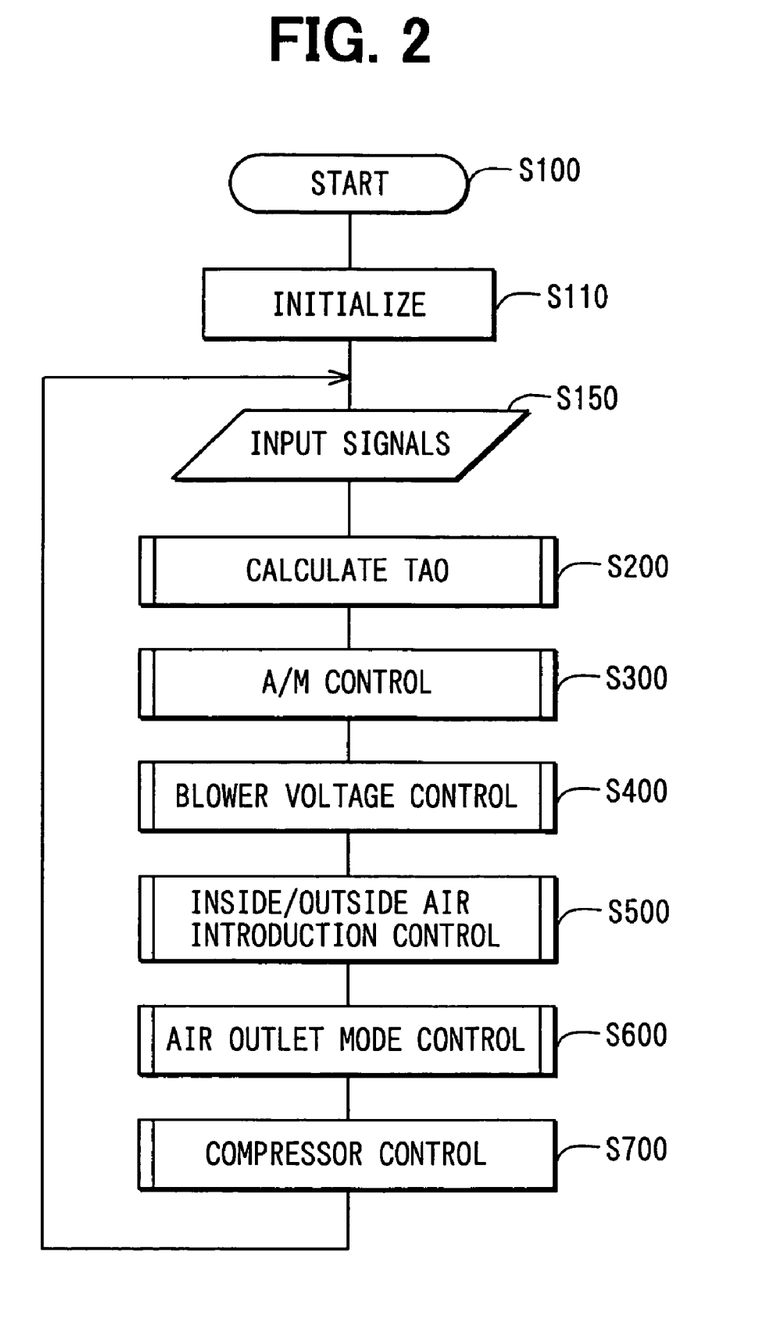
FIG. 2 is a flowchart showing a basic control operation of a control unit of the vehicle air conditioner.

As shown in FIG. 2, at step S100, the microcomputer 31 starts control operation after the IG switch is turned on. At step S110, conversion values, flags, and the like are initialized. At step S150, the sensor signals of the environmental conditions (environmental condition signal) are input to the microcomputer 31 from the inside air temperature sensor 33, the outside air temperature sensor 34, the sunlight sensor 35. Operation signals (i.e., operation switch statuses) are also input to the microcomputer 31 from the operating portion 37 and the temperature setting switch 36.

At step S200, a target blowing temperature TAO of air blown into the passenger compartment is calculated in accordance with the following formula (1) based on the environmental condition signals input at step S150.

$$TAO = KSET \times TSET - KR \times TR - KAM \times TAM - KS \times TS + C \quad (1)$$

Here, each of KSET, KR, KAM and KS is a coefficient, and C is a constant. TSET is a set temperature for the passenger compartment set by the temperature setting switch 36, and TR is an inside air temperature inside the passenger compartment. TAM is an air temperature outside the passenger compartment (outside air temperature), and TS is an amount of sunlight radiated into the passenger compartment.

At step S300, an open degree of the A/M door 22b is calculated based on an open-degree control characteristic of the A/M door 21b prestored in the microcomputer 31 in correspondence to the target blowing temperature TAO. The A/M door 22b is controlled by the actuator at a calculated open degree, so that the temperature of air blown into the passenger compartment from the air outlet openings is. automatically controlled.

At step S400, a blower voltage VF corresponding to the target blowing temperature TAO or the like is calculated based on a blower voltage control characteristic pre-stored in the microcomputer 31. The blower voltage VF is applied to the blower motor 24 via the driving circuit 30, so as to rotate the fan 23 connected to the blower motor 24. Therefore, an amount of air (air-blowing amount) brown into the passenger compartment is controlled. However, a desired air-blowing amount is varied for every passenger, and it is difficult to uniformly determine the desired air-blowing amount. Therefore, in this embodiment, a passenger's preference of the air-blowing amount is learned when a passenger manually set the air-blowing amount, so that a preference of the passenger is reflected in air-blowing control characteristics.

At step S500, an inside/outside air introduction mode corresponding to the target blowing temperature TAO is calculated based on an inside/outside air mode control characteristics prestored in the microcomputer 31. Then, an actuator (not shown) of the inside/outside air switching door 22a is automatically controlled so as to drive the inside/outside air switching door 22a.

At step S600, an air outlet mode corresponding to the target blowing temperature TAO is calculated based on outlet mode control characteristics prestored in the microcomputer 31. Then, actuators (not shown) of the defroster door 22c, the face door 22d and the foot door 22e are automatically controlled. When the air outlet mode is manually selected by switches of the operating portion 37, each of door 22a, 22c, 22d and 22e is controlled so as to set the manually selected mode.

At step S700, the compressor (not shown) of the refrigerator cycle is controlled. After the processing at step S700, the control routine returns to step S150, and various signals are input to the microcomputer 31 again, and the air conditioning controls shown in step S150-S700 are repeated.

Figure 3:
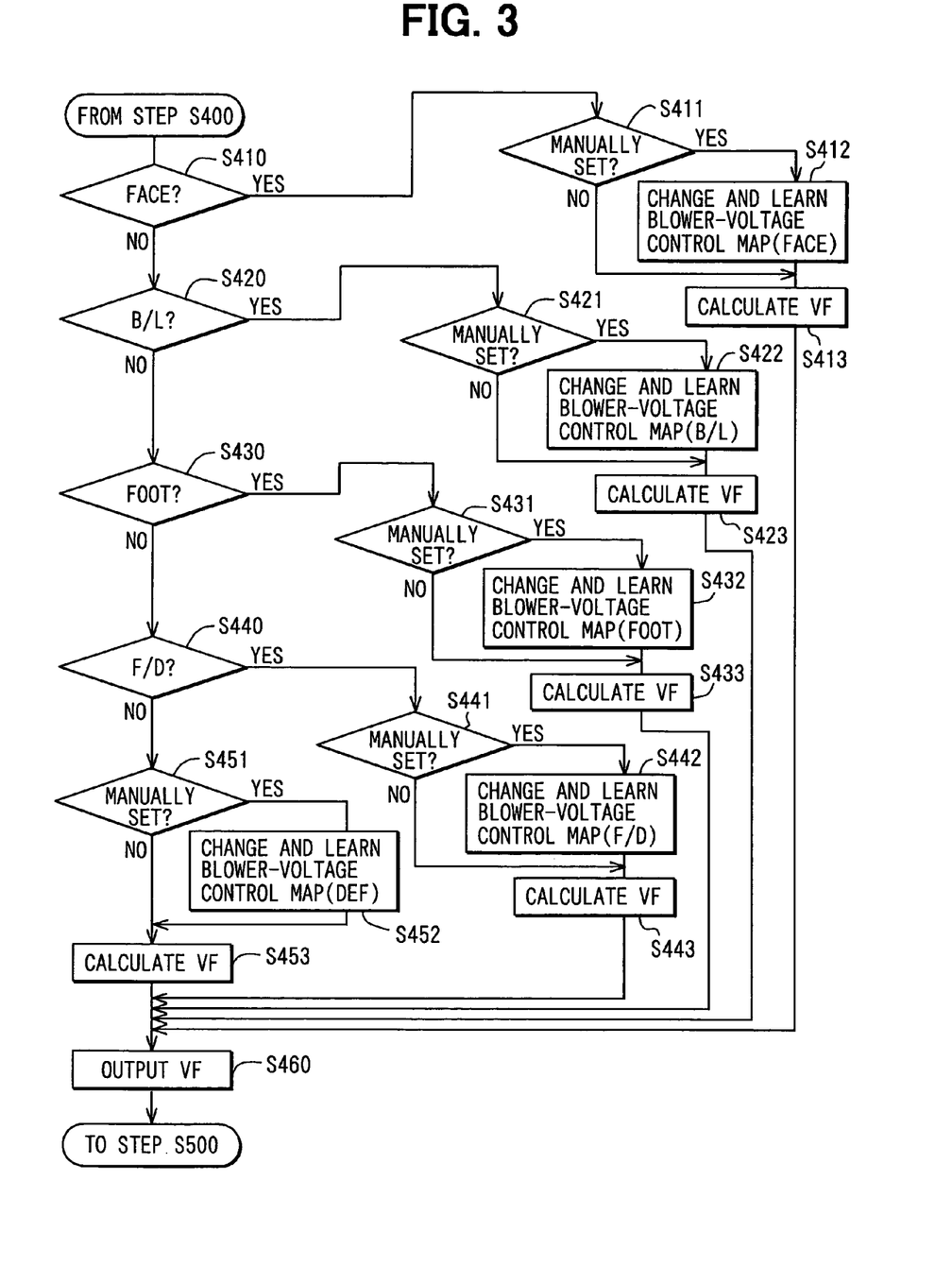
FIG. 3 is a flowchart showing a control operation of an air-blowing amount in the control unit, according to the first embodiment.
Figure 4A:
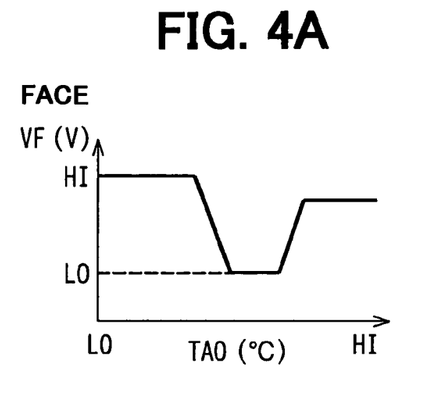
FIGS. 4A-4E are graphs showing blower-voltage control patterns corresponding to a target air-blowing temperature in a face mode, in a bi-level (B/L) mode, in a foot mode, in a foot-defroster (F/D) mode and in a defroster (DEF) mode, respectively, according to the first embodiment.
Figure 4B:
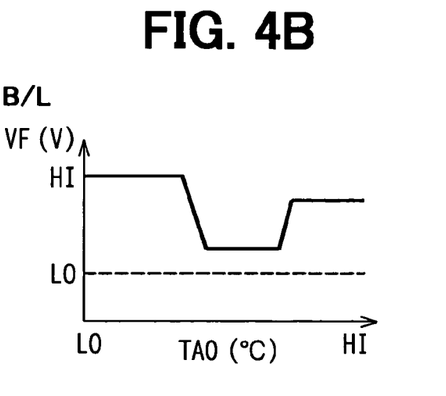
Figure 4C:
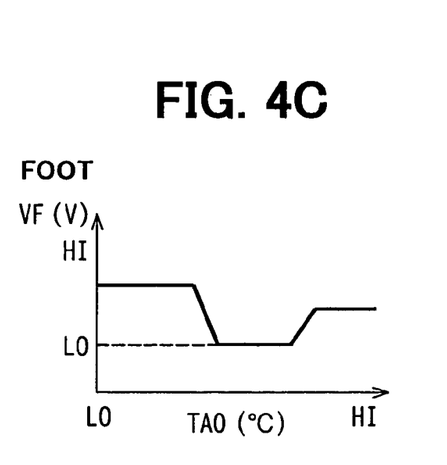
Figure 4D:
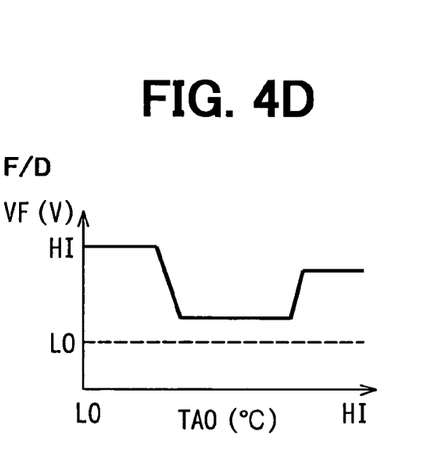
Figure 4E:
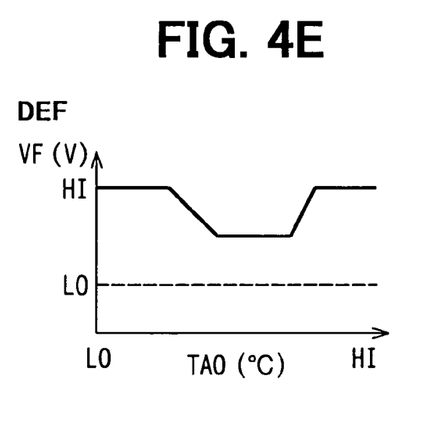

Next, the blower voltage control at step S400 in FIG. 2 will be now described in detail. As shown in FIG. 3, at step S410, it is determined whether the air outlet mode is the face mode or not. When the face mode is selected, the control routine proceeds to step S411, and it is determined whether the air-blowing amount is manually operated or not. When the air-blowing amount is manually operated, the control routine proceeds to step S412, and a blower voltage control map (FIG. 4A) in the face mode is changed and learned. At step S413, a blower voltage VF in the face mode is calculated. At step S460, the calculated blower voltage VF is output, and the control routine proceeds to step S500.

At step S420, it is determined whether the air outlet mode is the B/L mode or not. When the B/L mode is selected, the control routine proceeds to step S421, and it is determined whether the air-blowing amount is manually operated or not. When the air-blowing amount is manually operated, the control routine proceeds to step S422, and a blower voltage control map (FIG. 4B) in the B/L mode is changed and learned. At step S423, a blower voltage VF in the B/L mode is calculated. At step S460, the blower voltage VF is output, and the control routine proceeds to step S500.

At step S430, it is determined whether the air outlet mode is the FOOT mode or not. When the FOOT mode is selected, the control routine proceeds to step S431, and it is determined whether the air-blowing amount is manually operated or not. When the air-blowing amount is manually operated, the control routine proceeds to step S432, and a blower voltage control map (FIG. 4C) in the FOOT mode is changed and learned. At step S433, a blower voltage VF in the FOOT mode is calculated. At step S460, the blower voltage VF is output, and the control routine proceeds to step S500.

At step S440, it is determined whether the air outlet mode is the F/D mode or not. When the F/D mode is selected, the control routine proceeds to step S441, and it is determined whether the air-blowing amount is manually operated or not. When the air-blowing amount is manually operated, the control routine proceeds to step S442, and a blower voltage control map (FIG. 4D) in the F/D mode is changed and learned. At step S443, a blower voltage VF in the F/D mode is calculated. At step S460, the blower voltage VF is output, and the control routine proceeds to step S500.

At step S451, the air outlet mode is determined to be the DEF mode based on the above determinations, and it is determined whether the air-blowing amount is manually operated or not. When the air-blowing amount is manually operated, the control routine proceeds to step S452, and a blower voltage control map (FIG. 4E) in the DEF mode is changed and learned. At step S453, a blower voltage VF in the DEF mode is calculated. At step S460, the blower voltage VF is output, and the control routine proceeds to step S500.

The manual operation of the air-blowing amount is a specific operation relevant to the learning of the manual operation and correcting of the control characteristic (learning correction) in the above air-blowing amount control.

A changing method (learning correction method) of the control map of the blower voltage VF is performed in the following manner, for example. As shown in FIG. 5, an original pattern of the blower voltage control map for an air-outlet mode is prestored as an initial control characteristic. When a first operation is performed by a passenger and the air blowing amount (blower voltage VF) is decreased as shown in FIG. 5A, the slope portion of the original pattern is moved in parallel so as to pass the operation point M1.

Figure 5A:
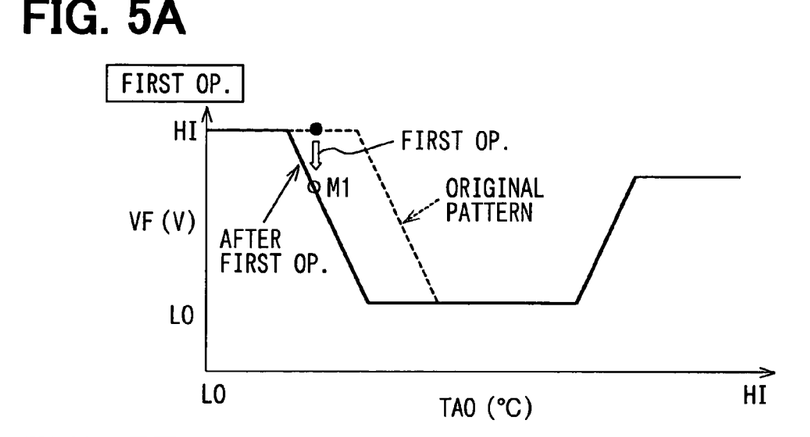
FIG. 5A is a characteristic graph showing a blower-voltage control pattern after reflecting a first manual operation in an original blower-voltage control pattern.

Thus, the learning correction is performed for the blower voltage control characteristic, so that the blower voltage control characteristic is changed to be a first learning pattern shown by the bold solid line in FIG. 5A.

Figure 5B:
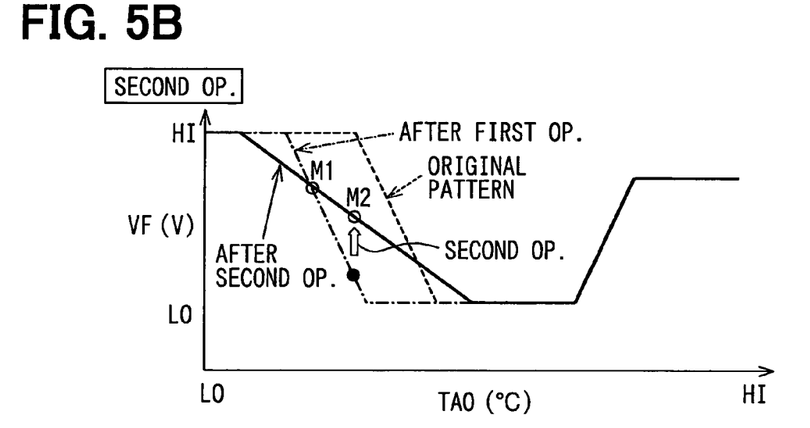
FIG. 5B is a characteristic graph showing a blower-voltage control pattern after reflecting a second manual operation in the blower-voltage control pattern shown in FIG. 5A.

When a second operation is performed by the passenger and the air blowing amount is increased as shown in FIG. 5B, the slope portion of the first learning pattern is changed so as to pass both the operation points M1 and M2. Thus, the learning correction is performed for the first learning pattern, so that the blower voltage control characteristic is changed to be a second learning pattern shown by the bold solid line in FIG. 5B.

Figure 5C:
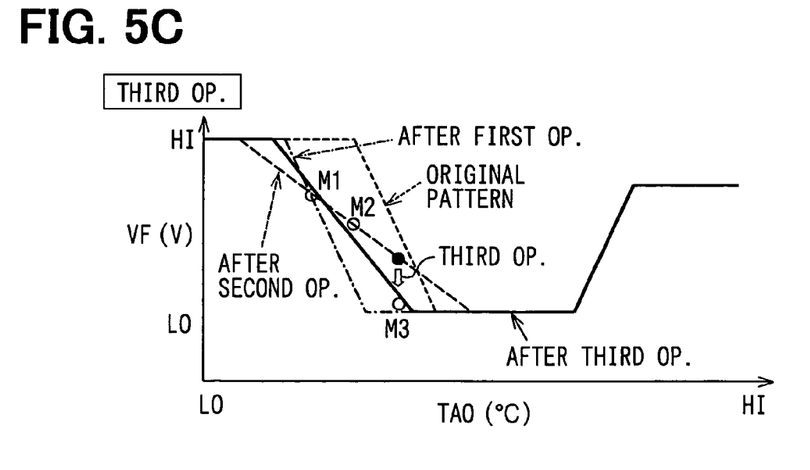
FIG. 5C is a characteristic graph showing a blower-voltage control pattern after reflecting a third manual operation in the blower-voltage control pattern shown in FIG. 5B, according to the first embodiment.

When a third operation is performed by the passenger and the air blowing amount is decreased as shown in FIG. 5C, the operation points M1, M2 and M3 are approximated by a least squares method so as to calculate a line (third learning pattern). The slope portion of the second learning pattern is replaced by the calculated line using the operation points M1 M2, and M3. Thus, the learning correction is performed for the second learning pattern, so that the blower voltage control characteristic is changed to be the third learning pattern shown by the bold line in FIG. 5C. When manual operations are performed more than three times, the points of the manual operations are approximated by the least squares method so as to calculate a new control line (new learning pattern).

In this embodiment, the learning correction can be also performed for the control characteristics in accordance with the manual operations of the manual air outlet-mode selecting switch 42 and the manual inside/outside air selecting switch 43, in the air outlet-mode control and the inside/outside air introduction mode control. The manual air outlet-mode selecting switch 42, the manual inside/outside air selecting switch 43 and the manual air-blowing amount setting switch 44 are operating units. The operating units are manually operated by the passenger for setting air conditioning states in the passenger compartment. The learning correction for various control characteristics is performed based on manual operations of the operating units. The manual operations are specific operations of the learning corrections in this embodiment.

As shown in FIG. 7, the operating portion 37 has an indicator 38 (information unit). The indicator 38 is constructed with a liquid crystal panel. The indicator 38 has indicating portions for indicating the set temperature, the air-outlet mode, the air-blowing amount. The indicator 38 also has an operation-frequency indicating portion 38a for indicating an operation frequency of the operation switches (operating units).

The operation-frequency indicating portion 38a notifies the passenger (user) of the operation frequency of the operation switches.

Next, a control operation for notifying the operation frequency of the operation switches to the user will be now described with reference to FIG. 6. The control routine, which is used for integrating the number of operations of the operation switches, has four variables, for example. The four variables include a number of operations A in a period 1 (variable 1), a number of operations B in a period 1 (variable 2), a number of operations A in a period 2 (variable 3), and a number of operations B in a period 2 (variable 4).

Figure 6:
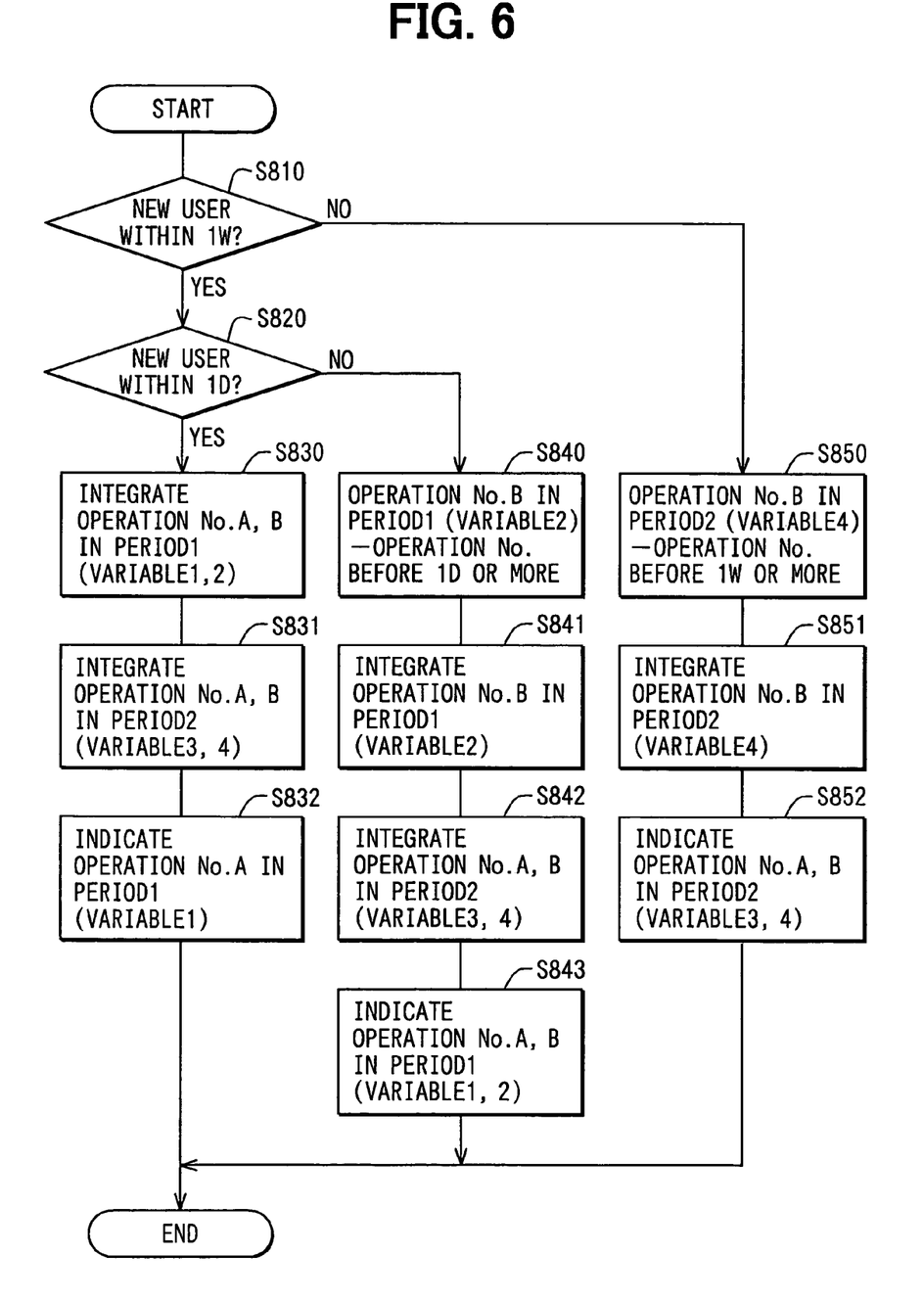
FIG. 6 is a flowchart showing a control operation for informing operation number to a user (passenger), according to the first embodiment.

As shown in FIG. 6, at step S810, the microcomputer 31 determines whether a new user is detected within recent one week (1W). The detection of the new user is performed based on a user code input from a cell phone or the like. When the new user is detected within the recent one week (1W), the control routine proceeds to step S820, and it is determined whether the new user is detected within recent one day (1D). When the new user is detected within the recent one day (1D), the control routine proceeds to step S830. When the operating units are manually operated, the number of the manual operations are stored as a number of operations A in a period 1 (variable 1) and a number of operations B in the period 1 (variable 2). The numbers of operations A and B in the period 1 (variables 1, 2) are respectively integrated with numbers of operations A and B (variables 1, 2) which are integrated up to the time point. Here, the operating units include the manual air outlet-mode selecting switch 42, the manual inside/outside air selecting switch 43 and the manual air-blowing amount setting switch 44.

At step S831, the number of the manual operations of the operating units is also stored to be respectively integrated with a number of operations A in a period 2 (variable 3) and a number of operations B in the period 2 (variable 4). That is, at the moment (i.e., within one day after detecting the new user), the number of operations are stored to be integrated with the numbers of operations A, B in the period 1, 2 (variables 1-4).

At step S832, the number of operations A in the period 1 (variable 1) is indicated by a bar graph on the operation-frequency indicating portion 38a of the indicator 38, and the control routine is terminated. Here, the variable 1 is used for indicating the number of operations performed in the first one day (1D).

At step S820, when it is determined that a new user is detected before one day (1D), the control routine proceeds to step S840. A number of operations of the operating units, which had been integrated until one day (1D) before the time point, is subtracted from the number of operations B in the period 1 (variable 2). That is, at step S840, the number of operations B in the period 1 (variable 2) becomes a number of operations, which has been integrated in a recent one day (1D) with respect to the time point. Here, the number of operations B in the period 1 (variable 2) is used one day after detecting the new user until one week after detecting the new user, for indicating recent frequency of manual operations (i.e., manual operations performed in the recent one day).

At step S841, when the operating units are manually operated, the number of the manual operations is stored so as to be integrated with the number of manual operations B in the period 1 (variable 2). Therefore, the number of operations B in the period 1 (variable 2) is updated so as to indicate the number of manual operations performed in the recent one day (1D).

At step S842, when the operating units are manually operated, the number of the manual operations is stored so as to be respectively integrated with the numbers of manual operations A, B in the period 2 (variable 3, 4). That is, at the moment, i.e., one day after detecting the new user until one week after detecting the new user, the number of operations is stored so as to be respectively integrated with the variables 2-4. Here, the variable 1 is fixed for indicating the number of manual operations performed in the first day (1D).

At step S843, the numbers of operations A, B in the period 1 (variables 1, 2) are indicated by using comparable bar charts on the operation-frequency indicating portion 38a of the indicator 38 as shown in FIG. 7 for example, and the control routine is terminated.

On the contrary, at step S810, when it is determined that a new user is detected before the one week (1W) with respect to the time point, the control routine proceeds to step S850.

A number of operations of the operating units, which had been integrated until one week (1W) before the time point, is subtracted from the number of operations B in the period 2 (variable 4). That is, at step S850, the number of operations B in the period 2 (variable 4) becomes a number of operations, which has been integrated in a recent one week (1W) with respect to the time point. Here, the number of operations B in the period 2 (variable 4) is used one week after detecting the new user, for indicating recent frequency of manual operations (i.e, manual operations performed in the recent one week 1W).

At step S851, when the operating units are manually operated, the number of the manual operations is stored so as to be integrated with the number of manual operations B in the period 2 (variable 4). Therefore, the number of operations B in the period 2 (variable 4) is updated so as to indicate the number of manual operations performed in the recent one week (1W).

At step S852, the numbers of operations A, B in the period 2 (variables 3, 4) are indicated by using comparable bar charts on the operation-frequency indicating portion 38a of the indicator 38 as shown in FIG. 7 for example, and the control routine is terminated.

That is, after the one week (1W) after detecting the new user, the number of operations is still stored so as to be integrated with the variable 4, for calculating the number of operations performed in the recent one week (1W). Here, the variable 3 is fixed one week after detecting the new user for indicating the number of manual operations performed in the first one week (1W).

In conclusion, the number of the specific operations, which is relevant to the learning correction, performed by the passenger is indicated on the operation-frequency indicating portion 38a of the indicator 38 until one day (1D) passes after a detection of a new user. Between one day (1D) and one week (1W: seven days) after the detection of the new user, the number of the specific operations performed in the first one day (1D) is indicated on the operation-frequency indicating portion 38a by using the variable 1. The number of the specific operations performed in the most recent one day (1D) is also indicated by using the variable 2 while being compared with the number of the specific operations performed in the first day. Namely, the variable 1 and the variable 2 are comparably indicated on the operation-frequency indicating portion 38a. The most recent one day (1D) means one day (1D) immediately before the time point of the indication.

Here, the first one day (1D) is equivalent to the first predetermined period, and the most recent one day (1D) is equivalent to the second predetermined period.

Next, one week (1W) after the detection of the new user, the number of the specific operations performed in the first one week (1W) is indicated on the operation-frequency indicating portion 38a of the indicator 38 by using the variable 3. The number of the specific operations performed in the most recent one week (1W) is also indicated by using the variable 4 while being compared with the number of the specific operations performed in the first week. Namely, the variable 3 and the variable 4 are comparably indicated on the operation-frequency indicating portion 38a. The most recent one week (1W) means one week (1W) immediately before the time point of the indication.

Here, the first one week (1W) is equivalent to the first predetermined period, and the most recent one week (1W) is equivalent to the second predetermined period.

Thus, the user visually recognizes the number of the specific operations performed in the starting period (first predetermined period) of the learning correction. Besides, the user also visually recognizes the number of the specific operations performed in a most recent period (second predetermined period). Thus, the user can visually confirm the progress degree of the learning correction of the control characteristic. Thus, the user can realize the effect of the learning correction, even when the number of the specific operation decreases after the learning correction control progresses.

The Second Embodiment

The second embodiment of the present invention will be now described with reference to FIGS. 8-9C.

Figure 8:
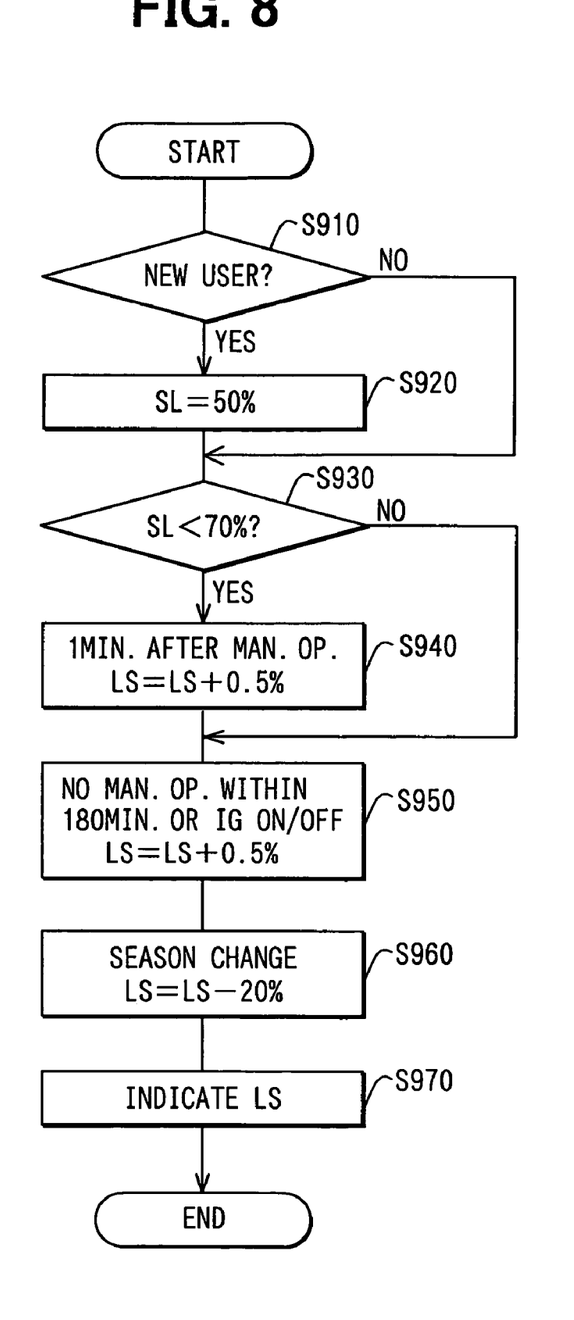
FIG. 8 is a flowchart showing a control operation for informing a user's satisfaction level (SL) according to a second embodiment in the present invention.
Figure 9A:
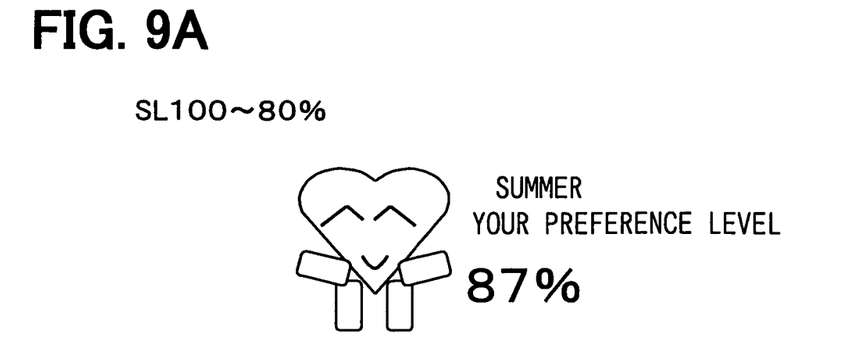
FIGS. 9A-9C are schematic diagrams showing display examples indicated on an indicator according to the second embodiment in the present invention.
Figure 9B:
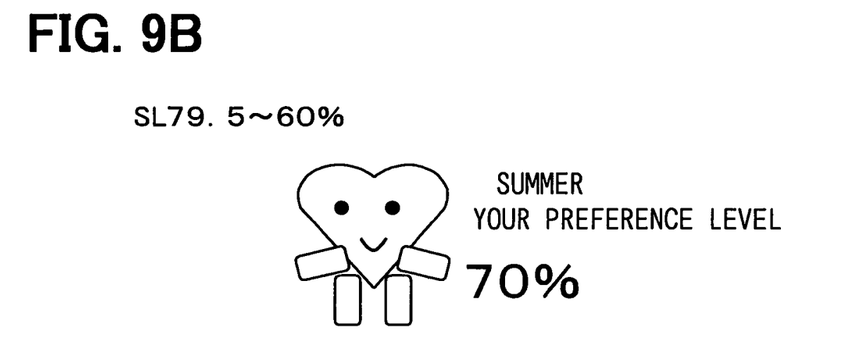
Figure 9C:
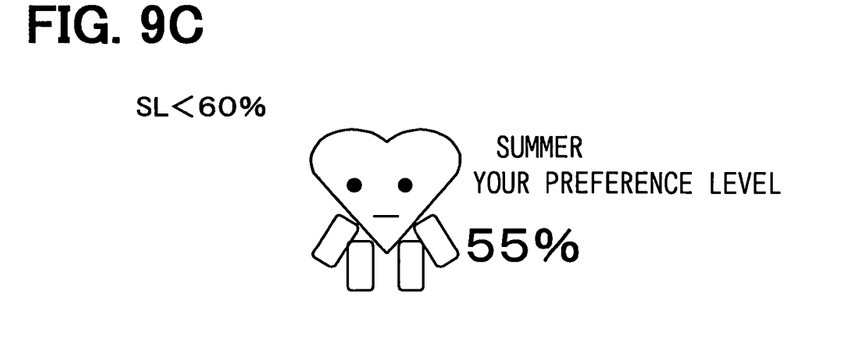

An informing control operation shown in FIG. 8 in this embodiment is simultaneously executed while the microcomputer 31 executes the air conditioning control routine shown in FIG. 2.

As shown in FIG. 8, at step S910, the microcomputer 31 determines whether a new user is detected. The detection of the new user is performed based on a user code input from a cell phone, or the like.

When it is determined that the new user is detected at step S910, the control routine proceeds to step S920. At step S920, the user satisfaction level SL is initialized at 50%, and the control routine proceeds to step S930. When it is determined that a new user is not detected at step S910, the control routine proceeds to step S930.

At step S930, it is determined whether the user satisfaction level SL is less than 70%. When the user satisfaction level SL is less than 70%, the control routine proceeds to step S940. When the user satisfaction level SL is equal to or greater than 70%, the control routine proceeds to step S950.

At step S940, the user satisfaction level SL is increased by 0.5% so that the user satisfaction level SL is updated, when one minute passes after the last manual operation of the operating units. Then, the control routine proceeds to step S950. Here, the operating unit is at least one of the manual air outlet-mode selecting switch 42, the manual inside/outside air selecting switch 43 and the manual air-blowing amount setting switch 44.

At step S950, the user satisfaction level SL is increased by 0.5% so that the user satisfaction level SL is updated, when at least one of specific conditions is determined positive. The specific conditions at step S950 are that any manual operations has not been performed for 180 minutes and any manual operations has not been performed in a period between the moment when the ignition switch is turned on and the moment when the ignition switch is turned off.

At step S960, when the season is changed, the user satisfaction level SL is subtracted by 20% so that the user satisfaction level SL is updated. In this embodiment, a changing point of the season is predetermined in every three months based on a calendar provided in the microcomputer 31.

At step S970, the season and the user satisfaction level SL are indicated on the operation-frequency indicating portion 38a of the indicator 38. When the user satisfaction level SL is between 100%-80%, a figure shown in FIG. 9A is indicated. When the user satisfaction level SL is between 79.5%-60%, a figure shown in FIG. 9B is indicated. When the user satisfaction level SL is less than 60%, a figure shown in FIG. 9C is indicated. The control routine is terminated after the indication of the user satisfaction level SL.

The user satisfaction level SL indicates a degree of the learning correction. When the frequency of the specific operation is decreased, the user satisfaction level SL is increased. The user satisfaction level SL is indicated on the operation-frequency indicating portion 38*a*. Here, the degree of the learning correction is indicated to be improved as the frequency of the specific operations decreases.

Therefore, the user visually recognizes the indicated user satisfaction level SL, so that the user can confirm the progress of the learning correction of the air conditioning control characteristic. Thus, the user can realize the effect of the learning correction, even when the number of the specific operation is decreased after the progress in the learning correction is performed.

Besides, the number of the specific operations is considered to increase when the season is changed. The user satisfaction level SL is subtracted and updated when the season is changed, at step S960. Therefore, the user satisfaction level SL can preferably coincide with the degree of the learning correction of the air conditioning characteristic.

Third Embodiment

Figure 10:
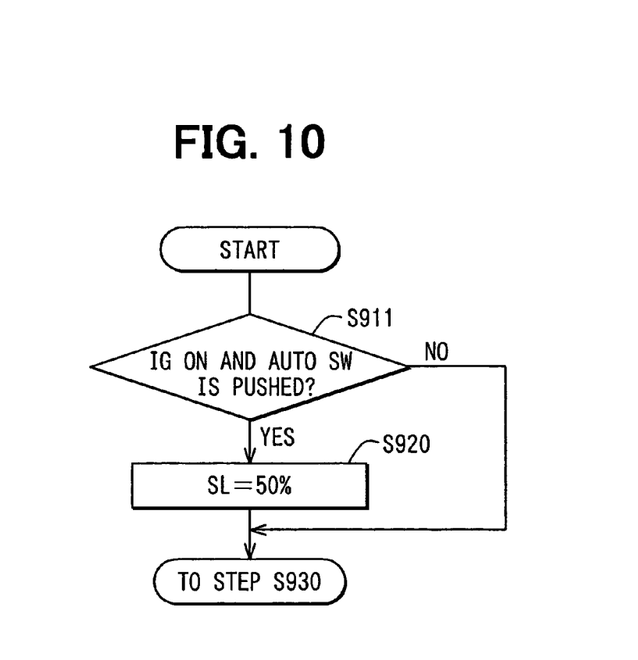
FIG. 10 is a flowchart showing a partial control operation of a control unit according to a third embodiment in the present invention.

The third embodiment of the present invention will be now described with reference to FIG. 10.

The detection method of the new user is not limited to the method which uses the cell phone. The learning correction can be started based on a determination shown at step S911 in FIG. 10, instead of step S910 in FIG. 8 in the second embodiment. In this embodiment, when the ignition switch is tuned on while the auto switch 41 is pushed, the learning correction result, which has been performed until the time point of the ignition, is canceled and initialized. The control characteristic is reset at the state before its shipment, so that the learning correction of the control characteristic is performed for a new user. The reset function of the control characteristic is also used for restudy for the same user.

Although the present invention has been fully described in connection with the preferred embodiments thereof with reference to the accompanying drawings, it is to be noted that various changes and modifications will become apparent to those skilled in the art.

For example, the information unit is not limited to the operation-frequency indicating portion 38*a* of the indicator 38. The user satisfaction level SL can be indicated on another section of the indicator 38. The information of the user satisfaction level SL can be performed by voice message or the like.

More than three numbers of the specific operations can be stored for predetermined periods respectively, and the stored numbers can be comparably indicated.

The change of the season can be determined based on the outside temperature signal detected by the outside air temperature sensor 34.

The parameters, such as 1 month, one week, 1 day, 0.5%, used in the above embodiments are examples. The parameters can be suitably set at predetermined values based on various characteristics of vehicles and vehicle air conditioners.

Such changes and modifications are to be understood as being within the scope of the present invention as defined by the appended claims.

What is claimed is:

1. A vehicle air conditioner comprising:
an environmental condition detection unit that detects a detection value relevant to an environmental condition of air conditioning in a passenger compartment;
an operating unit that is operated by a passenger, the operating unit including means for setting a plurality of operations which define an air conditioning state in the passenger compartment;
a control unit that automatically controls the air conditioning state in accordance with the detection value of the environmental condition which is detected by the environmental condition detection unit, the control unit including means for performing a learning correction of a control characteristic of the automatic control based on at least one of the plurality of operations of the operating unit that define the air conditioning state;
an information unit in communication with the control unit, the information unit including means for indicating to the passenger a frequency of the learning correction of the at least one of the plurality of operations which define the air conditioning state.

2. A vehicle air conditioner comprising:
an environmental condition detection unit that detects a detection value relevant to an environmental condition of air conditioning in a passenger compartment;
an operating unit that is operated by a passenger, the operating unit including means for setting a plurality of operations which define an air conditioning state in the passenger compartment;
a control unit that automatically controls the air conditioning state in accordance with the detection value of the environmental condition which is detected by the environmental condition detection unit, the control unit including means for performing a learning correction of a control characteristic of the automatic control based on at least one of the plurality of operations of the operating unit that define the air conditioning state;
an information unit in communication with the control unit, the information unit including means for indicating a frequency of the learning correction of the at least one of the plurality of operations which define the air conditioning state;
wherein the control unit controls the operation of the information unit such that the information unit comparably informs a number of the learning correction of the at least one of the plurality of operations of the operating unit, which is performed in a first predetermined period, and a number of the learning correction of the at least one of the plurality of operations of the operating unit which is performed in a second predetermined period, which is later than the first predetermined period.

3. The vehicle air conditioner according to claim 2, wherein the first predetermined period is a time period immediately after a start operation of the learning correction of the control unit.

4. The vehicle air conditioner according to claim 3, wherein the second predetermined period is a time period immediately before the control unit controls the operation of the information unit.

5. The vehicle air conditioner according to claim 1, wherein the control unit controls the operation of the information unit such that the information unit informs a progress degree of the learning correction in accordance with the frequency of the learning correction of the at least one of the plurality of operations.

6. The vehicle air conditioner according to claim 5, wherein the control unit controls the operation of the information unit such that as the frequency of the learning correction of the at least one of the plurality of operations decreases, the progress degree of the learning correction is improved.

7. A vehicle air conditioner comprising:
an environmental condition detection unit that detects a detection value relevant to an environmental condition of air conditioning in a passenger compartment;
an operating unit that is operated by a passenger, the operating unit including means for setting a plurality of operations which define an air conditioning state in the passenger compartment;
a control unit that automatically controls the air conditioning state in accordance with the detection value of the environmental condition which is detected by the environmental condition detection unit, the control unit including means for performing a learning correction of a control characteristic of the automatic control based on at least one of the plurality of operations of the operating unit that define the air conditioning state;
an information unit in communication with the control unit, the information unit including means for indicating a frequency of the learning correction of the at least one of the plurality of operations which define the air conditioning state;
wherein the information unit is an indicating unit which indicates the information relevant to the frequency of the learning correction of the at least one of the plurality of operations of the operating unit.

8. A vehicle air conditioner comprising:
an environmental condition detection unit that detects a detection value relevant to an environmental condition of air conditioning in a passenger compartment;
an operating unit that is operated by a passenger, the operating unit including means for setting a plurality of operations which define an air conditioning state in the passenger compartment;
a control unit that automatically controls the air conditioning state in accordance with the detection value of the environmental condition which is detected by the environmental condition detection unit, the control unit including means for performing a learning correction of a control characteristic of the automatic control based on at least one of the plurality of operations of the operating unit that define the air conditioning state;
an information unit in communication with the control unit, the information unit including means for indicating to the passenger a frequency of the learning correction of the at least one of the plurality of operations which define the air conditioning state; wherein
the information unit has first indication means for indicating an operation number during a first predetermined period, second indication means for indicating an operation number during a second predetermined period, and comparison means for comparing the operation number during the first predetermined period and the operation number during the second predetermined period.

* * * * *